(12) United States Patent
Redon et al.

(10) Patent No.: US 7,606,653 B2
(45) Date of Patent: Oct. 20, 2009

(54) VEHICLE SPEED DEPENDANT CALIBRATION TRIM FOR IMPROVED FUEL ECONOMY

(75) Inventors: Fabien G. Redon, Southfield, MI (US); Gary J. Hazelton, White Lake, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 11/954,120

(22) Filed: Dec. 11, 2007

(65) Prior Publication Data
US 2009/0150042 A1   Jun. 11, 2009

(51) Int. Cl.
*F02D 41/00* (2006.01)
(52) U.S. Cl. .................................................... 701/105
(58) Field of Classification Search ............... 701/105, 701/102, 110, 115; 123/478, 352
See application file for complete search history.

(56) References Cited

U.S. PATENT DOCUMENTS 4,896,641 A * 1/1990 Nagano et al. ......... 123/406.51
6,857,418 B2 * 2/2005 Corba ........................ 123/478
7,006,910 B2 * 2/2006 Schuricht et al. ............ 701/105

* cited by examiner

*Primary Examiner*—Hieu T Vo
(74) *Attorney, Agent, or Firm*—Harness, Dickey & Pierce, P.L.C.

(57) ABSTRACT

A control system and method for improving vehicle fuel economy is provided. A base timing module generates a base timing signal. A trim module calculates a vehicle speed compensation factor and generates a timing trim signal based on the vehicle speed compensation factor. A vehicle speed trim module adjusts a calibration parameter (such as engine timing for example) based on the base timing signal and the timing trim signal. According to some implementations, the trim module includes a base trim module and a vehicle speed compensation module. The base trim module generates a base trim signal. The vehicle speed compensation module generates the vehicle speed compensation factor. The base trim signal can be based on a speed of the engine. The base trim signal can further be based on a quantity of fuel delivered to the engine.

19 Claims, 4 Drawing Sheets

VEHICLE SPEED DEPENDANT CALIBRATION TRIM FOR IMPROVED FUEL ECONOMY

FIELD

The present disclosure relates to vehicle control systems and more particularly to vehicle control systems for improving vehicle fuel economy.

BACKGROUND

Diesel engines typically have higher thermal efficiency and lower fuel consumption rates than gasoline engines due to the increased compression ratio of the diesel combustion process and the higher energy density of diesel fuel. Consequently, diesel engines can have a higher thermal burn efficiency which can lead to improved fuel economy as compared to gasoline engines with similar output.

The development of diesel engines has become challenging in view of relatively stringent emission limits. One such challenge relates to limiting engine noise while attempting to improve fuel consumption and produce low levels of regulated emissions.

SUMMARY

The interior background noise level of a vehicle increases with vehicle speed as factors including wind noise, and tire rolling noise levels increase. Generally, the increased background noise can mask the engine noise. As such, a control system and method for improving vehicle fuel economy is provided. A base timing module generates a base timing signal. A trim module calculates a vehicle speed compensation factor and generates a timing trim signal based on the vehicle speed compensation factor. A vehicle speed trim module adjusts a calibration parameter (such as engine timing for example) based on the base timing signal and the timing trim signal.

According to some implementations, the trim module includes a base trim module and a vehicle speed compensation module. The base trim module generates a base trim signal. The vehicle speed compensation module generates the vehicle speed compensation factor. The base trim signal can be based on a speed of the engine. The base trim signal can further be based on a quantity of fuel delivered to the engine.

According to additional features, the vehicle speed trim module can adjust a turbo boost signal based on the base timing signal and the timing trim signal. The vehicle speed trim module can also adjust an exhaust gas recirculation (EGR) signal based on the base timing signal and the timing trim signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the disclosure, its application, or uses. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the term boost refers to an amount of compressed air introduced into an engine by a supplemental forced induction system such as a turbocharger. The term timing refers generally to the point at which fuel is introduced into a cylinder of an engine (fuel injection) is initiated.

Figure 1:
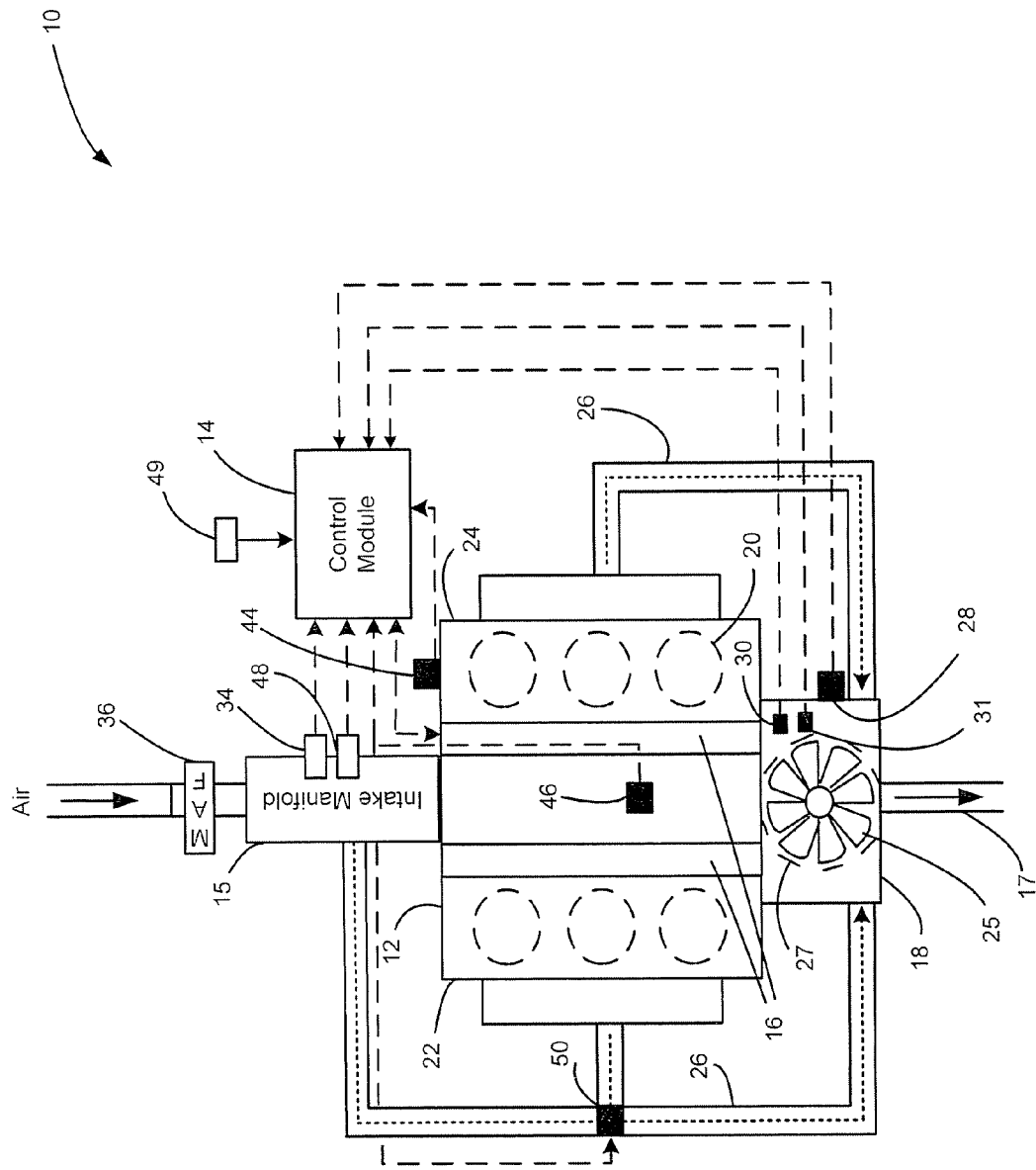
FIG. 1 is a functional block diagram of a control system that adjusts engine timing based on vehicle speed according to some implementations of the present disclosure.

Referring now to FIG. 1, an exemplary engine control system 10 is schematically illustrated in accordance with the present disclosure. The engine control system 10 includes an engine 12 and a control module 14. The engine 12 can further include an intake manifold 15, a fuel injection system 16 having fuel injectors (not specifically shown), an exhaust system 17 and a turbocharger 18. The exemplary engine 12 includes six cylinders 20 configured in adjacent cylinder banks 22, 24 in a V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the engine 12 can have an inline-type cylinder configuration. While an internal combustion engine utilizing sparkless and throttleless compression ignition such as a diesel engine is described, the present disclosure also applies to internal combustion engines utilizing spark ignition.

During engine operation, air is drawn into the intake manifold 15 by the inlet vacuum created by the engine intake stroke. Air is drawn into the individual cylinders 20 from the intake manifold 15 and is compressed therein. Fuel is injected by the injection system 16 and is mixed with air. In one example, the controller 14 can communicate with the injection system 16 to utilize pilot injection. For pilot injection a small amount of fuel is first injected into the cylinders 20 prior to the main charge in hope that the pilot charge will start to burn just before the main charge of fuel is injected, thus providing for prompt ignition of the main charge without significant delay. The air/fuel mixture is compressed and the heat of compression and/or electrical energy ignites the air/fuel mixture. Exhaust gas is exhausted from the cylinders 20 through exhaust conduits 26. The exhaust gas drives the turbine blades 25 of the turbocharger 18 which in turn drives compressor blades 25. The compressor blades 25 can deliver additional air (boost) to the intake manifold 15 and into the cylinders 20 for combustion.

The turbocharger 18 can be any suitable turbocharger such as, but not limited to, a variable nozzle turbocharger (VNT).

The turbocharger 18 can include a plurality of variable position vanes 27 that regulate the amount of air delivered from the vehicle exhaust 17 to the engine 12 based on a signal from the control module 14. More specifically, the vanes 27 are movable between a fully-open position and a fully-closed position. When the vanes 27 are in the fully-closed position, the turbocharger 18 delivers a maximum amount of air into the intake manifold 15 and consequently into the engine 12. When the vanes 27 are in the fully-open position, the turbocharger 18 delivers a minimum amount of air into the engine 12. The amount of delivered air is regulated by selectively positioning the vanes 27 between the fully-open and fully-closed positions.

The turbocharger 18 includes an electronic control vane solenoid 28 that manipulates a flow of hydraulic fluid to a vane actuator (not shown). The vane actuator controls the position of the vanes 27. A vane position sensor 30 generates a vane position signal based on the physical position of the vanes 27. A boost sensor 31 generates a boost signal based on the additional air delivered to the intake manifold 15 by the turbocharger 18. While the turbocharger implemented herein is described as a VNT, it is contemplated that other turbochargers employing different electronic control methods may be employed.

A manifold absolute pressure (MAP) sensor 34 is located on the intake manifold 15 and provides a (MAP) signal based on the pressure in the intake manifold 15. A mass air flow (MAF) sensor 36 is located within an air inlet and provides a mass air flow (MAF) signal based on the mass of air flowing into the intake manifold 15. The control module 14 uses the MAF signal to determine the A/F ratio supplied to the engine 12. An RPM sensor 44 provides an engine speed signal. An intake manifold temperature sensor 46 generates an intake air temperature signal. The control module 14 communicates an injector timing signal to the injection system 16. A vehicle speed sensor 49 generates a vehicle speed signal.

The exhaust conduits 26 can include an exhaust recirculation (EGR) valve 50. The EGR valve 50 can recirculate a portion of the exhaust. The controller 14 can control the EGR valve 50 to achieve a desired EGR rate.

The control module 14 controls overall operation of the engine system 10. More specifically, the control module 14 controls engine system operation based on various parameters including, but not limited to, driver input, stability control and the like. The control module 14 can be provided as an Engine Control Module (ECM).

The control module 14 can also regulate operation of the turbocharger 18 by regulating current to the vane solenoid 28. The control module 14 according to an embodiment of the present disclosure can communicate with the vane solenoid 28 to provide an increased flow of air (boost) into the intake manifold 15.

Figure 2:
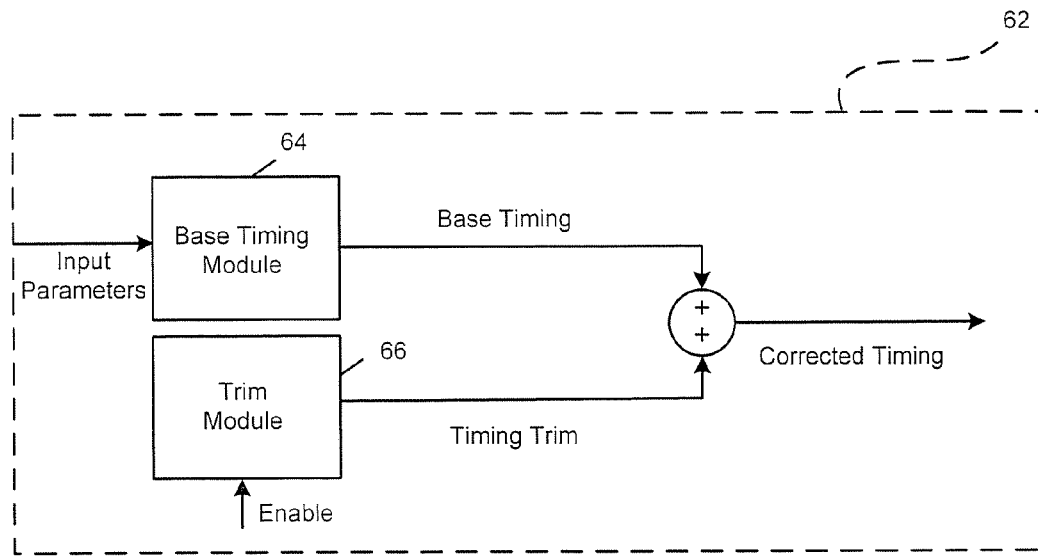
FIG. 2 is a logic diagram illustrating timing control according to some implementations of the present disclosure.
Figure 3:
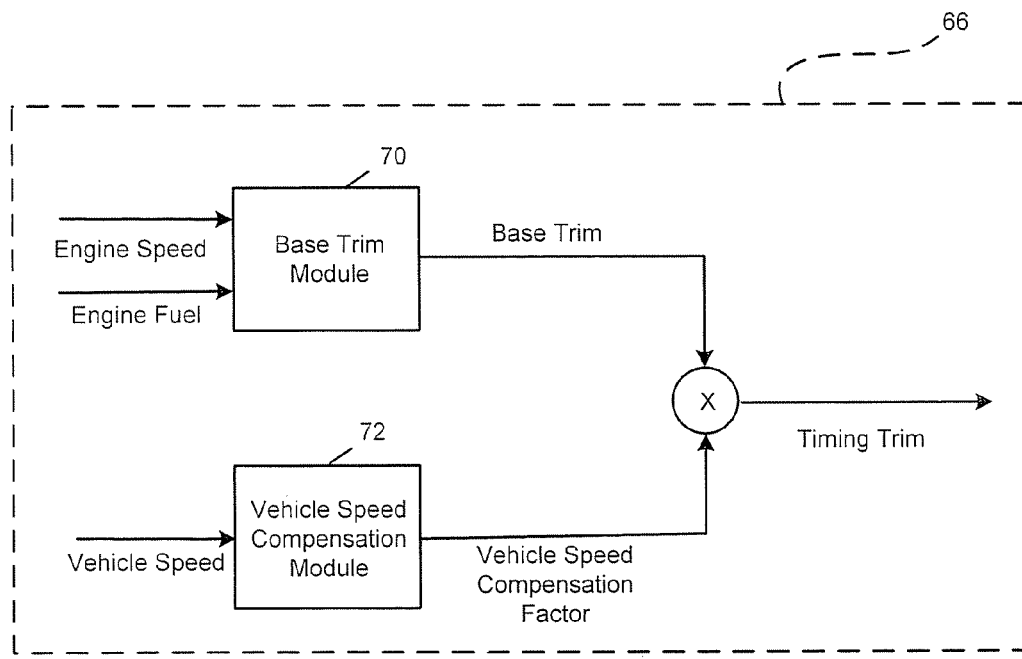
FIG. 3 is a logic diagram illustrating trim control according to some implementations of the present disclosure.
Figure 4:
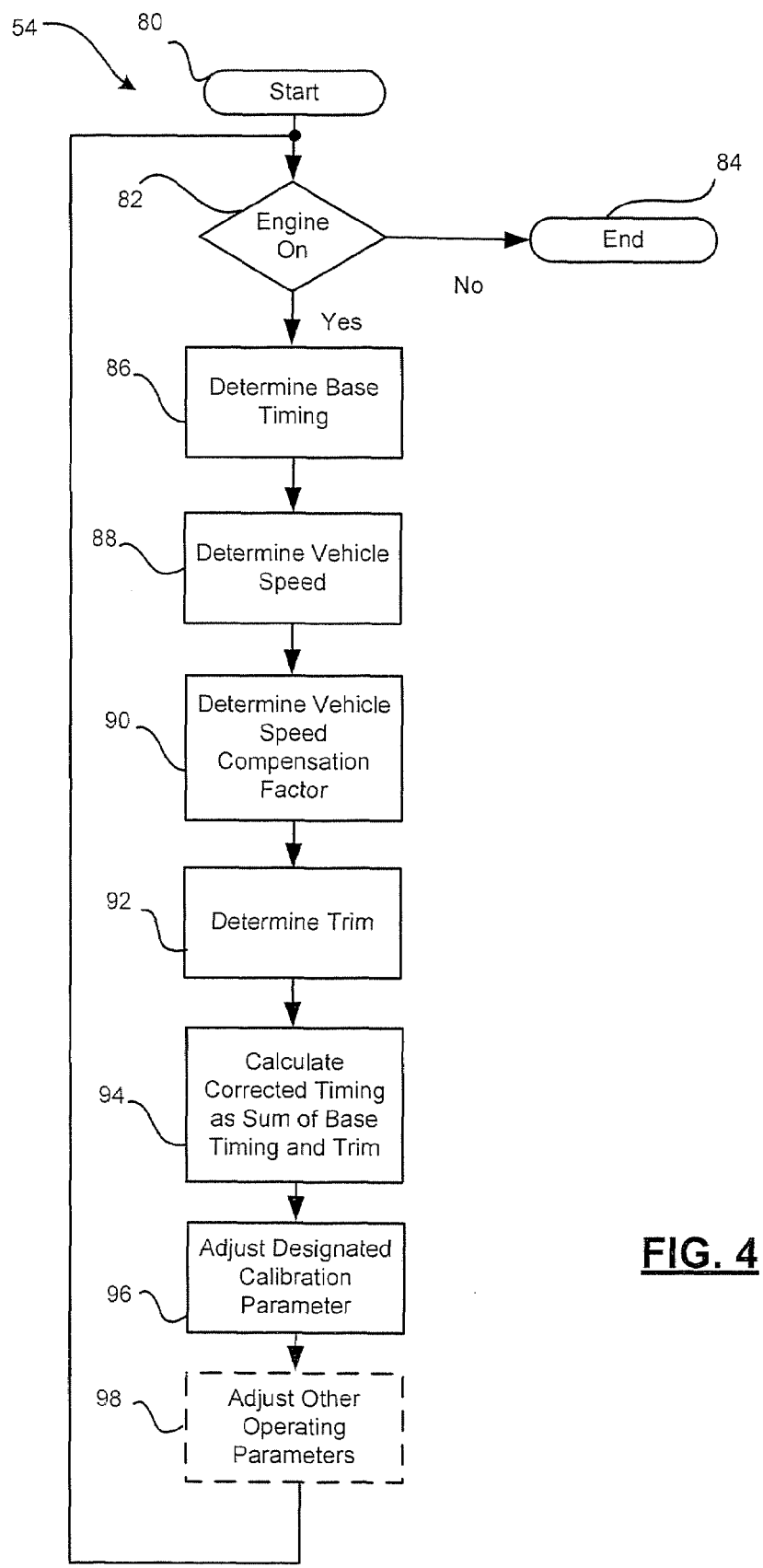
FIG. 4 is a flowchart showing steps for adjusting engine timing based on vehicle speed according to some implementations of the present disclosure.

With reference now to FIGS. 2-4, a method 54 (FIG. 4) for adjusting a calibration parameter based on vehicle speed according to an embodiment of the present disclosure will be described in further detail. As will become appreciated, a calibration parameter can include various combinations of parameters related to fuel injection timing, pilot quantity, pilot timing, injection pressure, EGR levels, turbo boost rate, and other parameters. As depicted in FIG. 2, a vehicle speed trim module 62 may include a base timing module 64 and a trim module 66. The base timing module 64 can generate a base timing signal based upon current engine input parameters. Exemplary input parameters may include a MAP signal, a MAF signal, engine RPM, boost signal and others. The trim module 66 can generate a timing trim signal. The vehicle speed trim module 62 can output a corrected timing signal based on the base timing signal and the timing trim signal. In one example, the vehicle speed trim module 62 can output a corrected timing signal based on the sum of the base timing signal and the timing trim signal.

Turning now to FIG. 3, the trim module 66 is shown in greater detail. The trim module 66 can be a standalone module or be integrated with the vehicle speed trim module 62. The trim module 66 may include a base trim module 70 and a vehicle speed compensation module 72. The base trim module 70 can generate a base trim signal based on operating parameters such as engine speed and a quantity of fuel being delivered to the engine 12 for example. The vehicle speed compensation module 72 can generate a speed compensation factor based on a vehicle speed. In one example, a lookup table can be provided that outputs a factor proportional to vehicle speed. The timing trim therefore, is generated based on the base trim signal and the speed compensation factor. In one example, the timing trim can be the product of the base trim signal and the speed compensation factor.

With specific reference now to FIG. 4, the method 54 will be described. Control begins in step 80. In step 82, control determines if the engine 12 is running. If the engine 12 is not running control ends in step 84. If the engine 12 is running, control determines a base timing in step 86. In step 88, control determines a vehicle speed. In step 90, control determines a vehicle speed compensation factor. In step 92, control determines a trim. In step 94, control calculates a corrected timing based on the base timing and the trim. As explained, the corrected timing can be a sum of the base timing and the trim. In step 96, control adjusts a designated calibration parameter (i.e., such as engine timing, etc.). Control then loops to step 86.

Again, the control method can adjust a calibration parameter based on vehicle speed from various operating parameters that relate to combustion noise including, but not limited to: fuel injection timing, pilot quantity, pilot timing, injection pressure, EGR levels, turbo boost rate, and others. In this way, the controller 14 can communicate with the injection system 16 to adjust fuel injection timing. In other examples, the controller 14 can communicate with the EGR valve 50 to adjust exhaust flow. In other examples, the controller 14 can communicate with the turbocharger 18 (such as by way of the electronic control vane solenoid 28 to manipulate the position of the vanes 27) to adjust boost.

Figure 5:
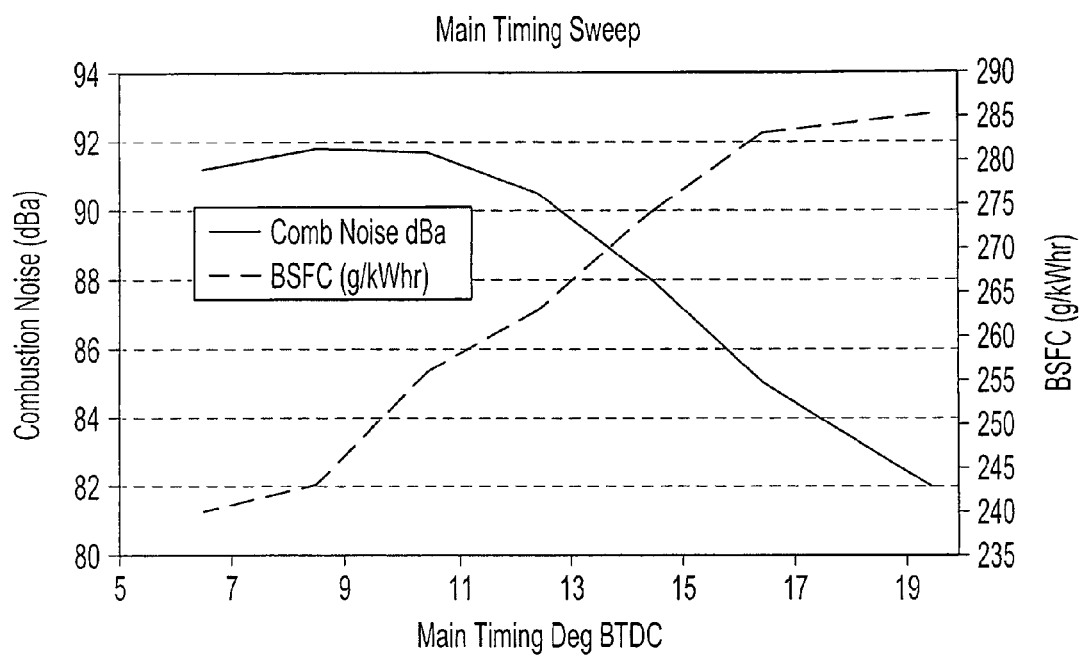
FIG. 5 is an exemplary plot of combustion noise and brake specific fuel consumption versus main timing according to some implementations of the present disclosure.

FIG. 5 shows an exemplary plot of combustion noise (dBa) and brake specific fuel consumption (BSFC) versus main timing (Deg BTDC). As graphically depicted, a trade-off exists between fuel consumption and combustion noise relative to main timing. Specifically, as main timing increases, fuel consumption increases while combustion noise decreases. The control strategy of the instant disclosure can optimize this trade-off by implementing a timing correction that is based on vehicle speed. As explained above, at higher vehicle speeds, higher background noise levels exist that can mask combustion noise. By taking advantage of this relationship, the timing calibration can be controlled for improved fuel economy while relaxing the combustion noise constraints.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A control system for an engine, comprising:
   a base timing module that generates a base timing signal;
   a trim module that calculates a vehicle speed compensation factor and generates a timing trim signal based on said vehicle speed compensation factor; and
   a vehicle speed trim module that adjusts a calibration parameter based on said base timing signal and said timing trim signal.

2. The control system of claim 1 wherein said trim module comprises:
   a base trim module that generates a base trim signal; and
   a vehicle speed compensation module that generates said vehicle speed compensation factor.

3. The control system of claim 2 wherein said base trim signal is based on a speed of the engine.

4. The control system of claim 3 wherein said base trim signal is further based on a quantity of fuel delivered to the engine.

5. The control system of claim 3 wherein said vehicle speed trim module adjusts engine timing based on said base timing signal and said timing trim signal.

6. The control system of claim 3 wherein said vehicle speed trim module further adjusts a turbo boost signal based on said base timing signal and said timing trim signal.

7. The control system of claim 3 wherein said vehicle speed trim module further adjusts an EGR signal based on said base timing signal and said timing trim signal.

8. The control system of claim 3 wherein said vehicle speed trim module further adjusts pilot quantity based on said base timing signal and said timing trim signal.

9. The control system of claim 3 wherein said vehicle speed trim module further adjusts pilot timing based on said base timing signal and said timing trim signal.

10. The control system of claim 1 wherein said vehicle speed compensation factor is based on an input from a vehicle speed sensor.

11. A method for operating an internal combustion engine, said method comprising:
    determining a base timing signal of the engine;
    determining a vehicle speed;
    determining a vehicle speed compensation factor based on the vehicle speed;
    generating a timing trim signal based on the vehicle speed compensation factor; and
    adjusting timing of the engine based on the base timing signal and the timing trim signal.

12. The method of claim 11, further comprising:
    generating a base trim signal and determining the timing trim signal based on the base trim signal.

13. The method of claim 12 wherein said base trim signal is based on a speed of the engine.

14. The method of claim 13 wherein said base trim signal is further based on a quantity of fuel delivered to the engine.

15. The method of claim 11, further comprising:
    adjusting a turbo boost signal based on the base timing signal and the timing trim signal.

16. A method for operating an internal combustion engine, said method comprising:
    determining a base timing signal of the engine;
    determining a vehicle speed;
    determining a vehicle speed compensation factor based on the vehicle speed;
    generating a timing trim signal based on the vehicle speed compensation factor; and
    adjusting a combustion noise parameter of the engine based on the base timing signal and the timing trim signal.

17. The method of claim 16, further comprising:
    determining a base trim signal based on the speed of the engine and determining the timing trim signal based on the base trim signal.

18. The method of claim 16, further comprising:
    adjusting a turbo boost signal based on the base timing signal and the timing trim signal.

19. The method of claim 16 wherein adjusting a combustion noise parameter includes at least one of adjusting fuel injection timing, adjusting pilot quantity, adjusting pilot timing, adjusting injection pressure, and adjusting EGR levels.

* * * * *